United States Patent [19]

Stemmler et al.

[11] 4,357,255

[45] Nov. 2, 1982

[54] PROCESS FOR THE PREPARATION OF LIQUID MIXTURES OF COMPOUNDS HAVING ISOCYANATE GROUPS

[75] Inventors: Ingo Stemmler, Odenthal; Hanns-Peter Müller, Odenthal-Blecher; Kuno Wagner, Leverkusen, all of Fed. Rep. of Germany

[73] Assignee: Bayer Aktiengesellschaft, Leverkusen, Fed. Rep. of Germany

[21] Appl. No.: 296,391

[22] Filed: Aug. 26, 1981

[30] Foreign Application Priority Data

Sep. 4, 1980 [DE] Fed. Rep. of Germany ....... 3033330

[51] Int. Cl.$^3$ ................... C08G 18/82; C07C 119/042
[52] U.S. Cl. .............................. 252/182; 260/453 SP; 521/53; 528/67
[58] Field of Search ................. 252/182; 260/453 SP; 521/53; 528/67

[56] References Cited

U.S. PATENT DOCUMENTS

| | | | |
|---|---|---|---|
| 3,109,824 | 11/1963 | Heiss | 521/53 X |
| 3,123,577 | 3/1964 | Heiss | 521/53 X |
| 3,738,946 | 6/1973 | Frulla et al. | 260/2.3 |
| 4,014,809 | 3/1977 | Kondo et al. | 252/182 |
| 4,025,559 | 5/1981 | Johnson | 260/578 |
| 4,328,368 | 5/1982 | Salloum et al. | 521/53 X |

FOREIGN PATENT DOCUMENTS

| | | |
|---|---|---|
| 962649 | 4/1957 | Fed. Rep. of Germany . |
| 2035175 | 3/1972 | Fed. Rep. of Germany . |
| 55-12128 | 1/1980 | Japan . |
| 1455454 | 11/1973 | United Kingdom . |
| 1456252 | 11/1973 | United Kingdom . |

OTHER PUBLICATIONS

Patents Abstracts of Japan, Band 4, No. 38, Mar. 27, 1980, p. 88C4.

*Primary Examiner*—Dolph H. Torrence
*Attorney, Agent, or Firm*—Gene Harsh; Joseph C. Gil; Lyndanne M. Whalen

[57] ABSTRACT

Waste polyurethane materials are made re-usable by converting them to liquid mixtures. Such liquid mixtures are made by reacting up to 70 parts by weight of polyurethane with a low-melting polyisocyanate at 100° to 250° C. in the presence of a catalyst. Suitable catalysts include the acid and neutral salts, phenolates, enolates and alcoholates of a metal of the 3rd, 4th or 5th Main Group or 1st, 2nd, 4th, 7th or 8th subgroup of the Periodic System of elements. The thus-produced mixtures contain isocyanates and are suitable as an isocyanate component in the production of polyurethane plastic materials.

6 Claims, No Drawings

PROCESS FOR THE PREPARATION OF LIQUID MIXTURES OF COMPOUNDS HAVING ISOCYANATE GROUPS

BACKGROUND OF THE INVENTION

This invention relates to a process in which polyurethane waste materials and/or polyurethane reject goods may be transformed into useable polyisocyanates. Specifically, the present invention relates to a process in which a liquid mixture of a polyisocyanate and such polyurethane waste material which may be used in the production of polyurethanes is produced.

As the polyurethane manufacturing industry grows, the problem of removing and re-using polyurethane waste materials or reject goods becomes increasingly significant. Flocks of flexible polyurethane foam have been bonded together to form composite bodies but only small quantities of flexible foamed plastic materials may be used in this manner. Waste semi-rigid and rigid polyurethane foams and elastomer granulates cannot, however, be employed in this manner. Consequently, large quantities of polyurethane waste goods and reject goods from rigid and flexible foam production and from elastomer production have to be dumped or destroyed at special refuse facilities. These methods of disposal are undesirable, however, because they create considerable ecological, technical and economic problems due to the low specific weight and the large volume of the waste or reject goods. Therefore, for ecological and economic reasons, there is a considerable interest in economically re-using the constantly increasing quantities of polyurethane waste materials.

German Offenlegungsschriften Nos. 2,362,919; 2,362,920 and 2,362,921 disclose processes for hydrolyzing waste materials from polyurethane foams at elevated temperatures using steam. However, these processes require high temperatures and pressures (for example 240° C. and 40 atm.) which means that the dissociation of the polyurethane wastes can only be performed with expensive equipment and at high costs. Furthermore, the reaction products precipitate in mixture with water and have to be separated through special processes prior to re-use.

It is furthermore well-known (German Offenlegungsschrift No. 2,238,109) to degrade polyurethane foam wastes into re-foamable polyols by heating them to 175° to 250° C. in high boiling dihydroxy compounds, preferably diethyleneglycol and advantageously in the presence of about 10% of a diethanol amine. By reurethanizing in this manner, short-chained polyols are obtained, which can only be used advantageously for the production of rigid polyurethane foams. According to the theory of the cited Offenlegungsschrift, this process is preferably only used for the dissociation of rigid polyurethane foam. Another disadvantage of this process is that the reaction is complete only after several hours. The process therefore requires a lot of energy and is difficult to transfer to continuously operating plants.

It is known from the German Offenlegungsschrift No. 2,035,175, especially from Examples 10 to 14, to dissolve polyurethane wastes in monomer diisocyanates at about 140° to 160° C. and to use these solutions as isocyanate components in the production of polyurethane plastics. As the mentioned embodiments of the German Offenlegungsschrift No. 2,035,175 and the comparison examples given below show, the production of these solutions is very time consuming and consequently requires a high amount of energy. Further, an appreciable degradation of the polyurethane wastes does not take place. Consequently, the solutions of German Offenlegungsschrift No. 2,035,175 are comparatively highly viscous mixtures which are of limited value in the production of polyurethane plastic materials. Moreover, highly branched polyurethanes may not be dissolved according to the process of this German Offenlegungsschrift. The highly viscous solutions which are initially produced also often have the serious disadvantage of solidifying after being stored for a short time at room temperature (in this connection, see the following Examples 1 to 5, and the corresponding Comparative Examples).

It would therefore, be advantageous to provide a process which permits re-use of polyurethane waste materials or polyurethane reject goods, without the disadvantages of these prior art processes.

SUMMARY OF THE INVENTION

It is an object of the present invention to provide a process for the production of mixtures of compounds having isocyanate groups which mixtures include polyurethane plastic materials.

It is also an object of the present invention to provide a process which permits re-use of polyurethane waste materials or polyurethane reject goods.

It is yet another object of the present invention to provide an economically and ecologically desirable process which permits re-use of polyurethane waste materials or polyurethane reject goods.

These and other objects which will be apparent to those skilled in the art are accomplished by heating the waste polyurethane material in a mixture with monomeric polyisocyanates usually used in polyurethane production, in the presence of a catalyst. Suitable catalysts include acid and neutral salts, phenolates, enolates and alcoholates of elements of the 3rd, 4th and 5th Main Groups and the 1st, 2nd, 4th, 7th and 8th subgroups of the Periodic System of elements.

The effectiveness of the process of the present invention is particularly surprising because the dissociated polyurethanes from the waste material which contains a wide variety of basic catalysts, (including tertiary amines) is not deactivated by a reaction with the isocyanate groups of the solvent. Rather, these catalysts accelerate oligomerization and cyclization reactions of isocyanates such as, the formation of uretdiones and isocyanurates (see Houben-Weyl, Methoden der organischen Chemie, Vol. XIV/2, page 64/68).

When dimerizing and trimerizing di- and multivalent isocyanates, in accordance with prior art techniques, highly viscous to solid products are produced (in contrast to the liquid product of the process of the invention). Further, it is known from the literature that soluble compounds of Fe, Hg, Ni, Cu, Zn, Al, Sn, V, Ti and Cr catalyze the trimerization of isocyanates (J. H. Saunders, K. C. Frisch, Polyurethanes, Chemistry and Technology, Part I, page 94 et seq., 1962). It is also known that Lewis acids such as Al Cl$_3$ and AlBr$_3$ (Saunders, Frisch, see above, and N. S. Dokunichin, L. A. Gavea, Z. obs. Chim 29, 297 (1959)) and neutral organotin compounds cause isocyanurate formation at room temperature. According to A. J. Bloodworth and A. G. Davies, J. Chem. Soc. 1965, 6858, tributyltin ethylate or bistributyltin oxide also trimerize methyl, ethyl, and phenyl isocyanate at room temperature within a few days. Therefore, it would be expected that a process such as that of the present invention, in which a metal compound is used as a catalyst, and in which di- and multivalent isocyanates act as the solvent in the presence of the amine and metal catalysts released from the decomposed polyurethane at 100° to 250° C. would yield a highly viscous or solid product.

Contrary to this expectation, the present invention provides a process for the production of mixtures of compounds having isocyanate groups, which mixtures are liquid at room temperature and are suitable for use as an isocyanate component in the production of polyurethane plastic materials. These mixtures of isocyanate-group containing compounds are prepared by reacting up to 70 parts by weight of polyurethane with 100 parts by weight of organic polyisocyanate which has a melting or softening point below 50° C. at 100° to 250° C., optionally using external pressure in the presence of a catalytic quantity of an acid or neutral salt, phenolate, enolate or alcoholate of a metal of the 3rd, 4th or 5th Main Group or the 1st, 2nd, 4th, 7th or 8th subsidiary group of the Periodic System of elements. This invention also relates to the use of these liquid mixtures as an isocyanate component in the production of polyurethane plastics materials is by isocyanatepolyaddition process.

DETAILED DESCRIPTION OF THE INVENTION

The polyurethanes which may be used in the practice of the present invention include any flexible or rigid, foamed or unfoamed polyurethanes, particularly waste materials such as those produced in the large scale production of polyurethane plastics materials or reject goods (e.g. imperfect parts).

Polyisocyanates which are suitable for the process of the present invention are any polyisocyanates used as starting materials is polyurethane chemistry which have a melting or softening point below 50° C. Polyisocyanates which are liquid at room temperature are preferable. As a result of the melting point reducing effect which may often be observed when carrying out the process of the invention, the reaction of the invention is also suitable for liquefying polyisocyanates that are solid at room temperature, for example, 4,4'-diisocyanato-diphenylmethane.

Examples of suitable polyisocyanates are: aliphatic diisocyanates such as hexamethylene diisocyanate and octamethylene diisocyanate; cycloaliphatic diisocyanates, such as cyclohexylene-1,4-diisocyanate and isophorone diisocyanate; aromatic polyisocyanates such as 2,4-diisocyanatotoluene, the commercial mixtures thereof with 2,6-diisocyanatotoluene, 4,4'-diisocyanato-diphenylmethane, the liquid modification products thereof having carbodiimide, uretoninime or urethane groups and/or the commercial mixtures thereof with 2,4'- and optionally 2,2'-diisocyanato-diphenylmethane; and the known phosgenation products of aniline/formaldehyde-condensates which represent higher functional polyisocyanates of the diphenylmethane series (in addition to the diisocyanato-diphenylmethane isomers mentioned). 2,4-Diisocyanatotoluene, the commercial mixtures thereof with 2,6-diisocyanatotoluene, the phosgenation products of aniline/formaldehyde-condensates, isophorone diisocyanate and hexamethylene diisocyanate are preferred. The above-described diisocyanatotoluene are, the most preferred isocyanate material. Mixtures of the polyisocyanates may also be used.

Catalysts which are suitable for the process of the present invention include any acid or neutral salts (i.e. salts which do not react basically in an aqueous medium), phenolates, enolates or alcoholates of metals of the 3rd, 4th or 5th Main Groups or the 1st, 2nd, 4th, 7th or 8th subsidiary group of the Periodic System of elements. The salts and enolates are preferred. Salts or enolates of di- or tetravalent tin, zinc, trivalent iron or trivalent bismuth are particularly preferred catalysts.

Examples of suitable catalysts are: the salts of inorganic or organic acids such as hydrochloric acid; hydrobromic acid; hydriodic acid; hydrofluoric acid; nitric acid; sulphuric acid; phosphoric acid; straight-chain or branched alkane carboxylic acids such as formic acid, acetic acid, lauric acid, stearic acid, ethyl-hexane carboxylic acid, naphthenic acids, unsaturated fatty acids such as oleic acid; elaidic acid; sorbic acid; aromatic acids such as benzoic acid; cinnamic acid; anthranilic acid; salicylic acid and metals of the type mentioned above, in particular Al, Sn (Sn II, Sn IV), Pb (Pb II, Pb IV), Sb, Bi, Cu, Zn, Cd, Hg, Ti, Zr, Mn, Fe, Co, and Ni. Suitable phenolates may be based on phenol, isononyl phenol or nitrophenol of the above-described metals. Enolates which may be used are the salt-like complexes of the metals mentioned above with acetoacetic acid ethyl ester or acetyl acetone. Appropriate alcoholates may be based on ethanol, methanol, isopropanol, n-butanol, isobutanol, tert.butabol, n- and isoamyl alcohol and the metals mentioned above. Salts having organic substituents (particularly alkyl substituents) at the cation, based on the acids and metals described above (particularly the corresponding tin compounds such as dialkyltin salts of organic monocarboxylic acids) are also suitable to the practice of the present invention.

The following are particularly effective catalysts: aluminum acetate, lead salts of naphthenic acids, lead octoate, lead ethyl hexoate, bismuth octoate, bismuth ethyl hexoate, zinc acetylacetonate, iron-III-acetyl-acetonate, zinc chloride and organic and inorganic tin compounds, e.g. stannous acylates (such as tin-II-octoate, tin-II-ethylhexoate, tin-II-valeriate, tin-II-acetate and tin-II-laurate), dialkyltin salts of carboxylic acids (e.g. dibutyltin diacetate, dibutyltin dilaurate, dibutyltin malate or dioctyltin diacetate), or inorganic salts (e.g. tin-II-chloride and tin-IV-chloride). Tin-IV-chloride is particularly preferred.

These catalysts may be used by themselves or combined in a mixture. The catalysts should be used in catalytic quantities, i.e. in a quantity of from 0.005 to 5 weight percent, preferably from 0.05 to 2.5 weight percent, and most preferably from 0.2 to 1.5 weight percent (based on the polyurethane to be used in the process of the invention).

In the process of the present invention up to 70 parts by weight, preferably from 10 to 50 parts by weight, of polyurethane may be used per 100 parts by weight of polyisocyanate. If polyisocyanates which are solid at room temperature with a melting point below 50° C. are used, it is advisable to only use approximately from 4 to 15 g of polyurethane per 100 g of polyisocyanate in order to ensure that liquid products of the process are produced. The viscosity of the mixtures obtained according to the invention fluctuates at 25° C. between 50 and 20,000 mPas depending upon the ratio of the starting materials and upon the viscosity of the polyisocyanate.

The process according to the invention may be carried out within a temperature range of from 100° to 250° C., preferably from 110° to 190° C. and most preferably from 130° to 170° C., optionally under elevated pressure. The reaction of the invention is generally completed after a few minutes.

In carrying out the process of the present invention, the polyurethane waste materials or the polyurethane reject goods are preferably cut, torn or ground in a suitable manner in order to increase the surface of the particles and thereby accelerate the dissociation reaction. These particles are then introduced into the polyisocyanate-catalyst mixture (hereinafter referred to as the "dissolver") which has been pre-heated to the reaction temperature at a rate such that new particles are added only after the others have dissolved in the dissolver. In the case of small mixtures and at the start of the reaction, the polyurethane particles may also be introduced into the cold or moderately heated dissolver and then together with the dissolver brought to the reaction temperature. The dissociation reactions are often completed in seconds, when the catalysts of the present invention are used while in less favorable cases these reactions require several minutes at the specified temperatures.

Foamed moldings may also be introduced as a whole into the dissolver of the invention. Foamed moldings of, for example, $22 \times 18 \times 22$ cm$^3$ may be completely dissolved within 1 to 5 minutes at 150° C. In order to accelerate the dissolving procedure, it is advantageous to rotate the dissolver by stirring, by moving the added moldings or by re-pumping the solvent. Molded foams with an integral surface may be dissolved as complete parts in approximately 2 to 15 minutes. Integral skin foams which are in roughly crushed form (e.g. $2 \times 3 \times 3$ cm) dissolve in 1 to 2 minutes.

The process of the present invention is particularly advantageous with respect to moldings having foamed-in support elements (e.g. car head rests, car seats and seat elements). After detaching the polyurethane layer, metallic support parts and plastic support elements which are non-deformable thermoplastically or insoluble or non-swelling under the experimental conditions may be removed from the dissolver and may be re-used for the production of moldings without further purification. In view of the fact that such support and spring elements are often produced with extreme precision and at a high working expense, a process which permits their recovery from scrap and re-use results in a considerable financial saving to the polyurethane molding manufacturer.

In principle, the process of the present invention may also be carried out by mixing the total quantity of the polyurethane with the dissolver or by adding the dissolver to the polyurethane. However, such a working method is impractical, particularly with foamed materials, due to the large volume of the polyurethane material.

In one advantageous variation of the process of the present invention, the NCO-functional dissolver component (e.g., 300 g of toluylene diisocyanate) may be heated with stirring under anhydrous conditions, and the dissociation catalyst, added at from 80° to 120° C. The mixture is further heated until the reaction temperature is reached, (e.g., 150° C.) and the polyurethane waste material (e.g., 65 g of flexible foam flocks) is introduced in portions into the dissolver as rapidly as possible (e.g., over a period of 6 minutes). The mixture is restirred for one to three times the length of time required for addition of the polyurethane waste and allowed to cool.

The process according to the invention allows polyurethane plastics waste materials or reject goods to be processed without application of pressure into OH-reactive compounds by means of simple stirring apparatus. As a result of the simplicity of the process, the manufacturer or processor of polyurethane plastics materials may convert waste materials directly into re-usable products, thereby reducing storage, transport and removal costs. Moreover, such re-use of polyurethane waste materials results in a considerable reduction in environmental pollution.

A particular advantage of the process of the invention is that due to the very rapid dissociation reaction, the process may be carried out on a continuous basis. According to a preferred variation of the process according to the present invention, polyurethane waste materials and the dissolver are introduced simultaneously or at separate points into a screw machine which is provided with an appropriate degassing device located upstream of the introduction point in the direction of flow, in order to remove the air introduced with the polyurethane. This has the advantage that, during the decomposition reaction of the invention, no secondary reactions caused by atmospheric oxygen may occur. When the process is carried out under pressure (e.g., using hexamethylene diisocyanate), mechanical devices such as those described in German Offenlegungsschrift No. 2,442,387 may be used. In this preferred variation of the present process, the residence time of the reaction mixture and the temperature control in the extruder may be coordinated with each other to ensure a complete decomposition of the polyurethane introduced in accordance with techniques known to those in the art.

The products of the process of the present invention constitute liquids at room temperature, which liquids generally have a desirable storage stability. The storage stability of products produced using neutral catalysts in particular may be increased, if necessary, by adding, for example, organic acid chlorides, such as benzoyl chloride. When uncolored polyurethanes are used, light yellow to yellow liquids are obtained in the practice of the present invention. The liquid mixtures made by the process of the present invention do not contain gel bodies or other amorphous or crystalline precipitates.

Having thus described our invention, the following Examples are given as illustrative thereof and should not be construed as limiting its scope. Unless otherwise indicated, all values in parts or percentages relate to parts by weight or percent by weight.

EXAMPLES

In the following Examples, the following polyurethanes were used:

Polyurethane I

This was a flexible, open-celled polyetherpolyurethane foam which was produced in the following manner:

100 parts by weight of a polyether built up from propylene oxide and ethylene oxide with 1,2-propylene glycol and trimethylol propane as the starter, with an OH number of 49, 4 parts by weight of water, 1.2 parts by weight of a polyether siloxane,
0.2 parts by weight of triethylene diamine, and
0.25 parts by weight of the tin-(II)-salt of 2-ethyl caproic acid were mixed together thoroughly.

50 parts by weight of toluylene diisocyanate (80% 2,4- and 20% 2,6-isomers)
were added to this mixture and were mixed thoroughly using a high speed stirrer. The foaming reaction commenced after a starting time of approximately 10 seconds and a white, flexible, elastic, open-pore polyurethane foam was produced. This foam had a volume weight of 38 kg/m$^3$ and was theoretically cross-linked with an excess of 0.02 NCO equivalents. (Characteristic number 102). It was then cured for two hours at 100° C.

Polyurethane II

This was a flexible, open-celled, polyetherpolyurethane foam which was produced according to the following specifications:
100 parts by weight of a polyether started on trimethylol propane and built up with ethylene oxide and propylene oxide, with an OH number of 35,
5.5 parts by weight of water,
1.4 parts by weight of a polyether siloxane,
0.15 parts by weight of permethyl-diethylene triamine and
0.25 parts by weight of the tin-(II)- salt of 2-ethyl-caproic acid were mixed together thoroughly.
61.5 parts by weight of toluylene diisocyanate (65% 2,4- and 35% 2,6-isomers)
were added to this mixture with vigorous stirring. The foam was allowed to cure for 2 hours at 100° C. and an additional 14 days at room temperature. The block was then cut into cubes with edges approximately 2 cm long.

Polyurethane III

This was a semi-rigid foamed polyurethane foam with a compact surface which was separated from the head rest of a commercially produced car (Ford Escort) and was cut into discs with dimensions of 2×3×3 cm$^3$.

Polyurethane IV

This was a closed-cell polyurethane rigid foam which was produced as follows:
75 parts of polyether built up from propylene oxide, with a mixture of sucrose, trimethylol propane and water as the starter, with an OH number of 380,
15 parts of a polyhydroxyl compound (OH number 450) started on the reaction product of diethyl phosphite, formaldehyde and diethanolamine,
10 parts of castor oil,
1 part of an aqueous solution of a fatty acid sulphonate,
2 parts of a commercially used dispersing agent,
1.5 parts of a polyether siloxane,
28 parts of Freon 12, and
0.8 parts of triethylamine were mixed thoroughly.
110 parts of a commercial diphenylmethane diisocyanate with an isocyanate content of 31%
were added to this mixture and mixed thoroughly with a high speed stirrer. After a starting time of approximately from 10 to 20 seconds, a rigid, yellow to brownish, closed-cell polyurethane foam was produced which had a volume weight of from 28 to 30 kg/m$^3$. After a curing time of several days, this polyurethane rigid foam was ground into smaller particles.

Polyurethane V

In addition to 60 parts by weight of the polyether used for the production of Polyurethane II, 20 parts by weight of a polyether started on glycerine and extended with ethylene oxide and propylene oxide, with an OH number of 45,
4.5 parts by weight of water,
1.0 parts by weight of polyether siloxane,
0.1 parts by weight of permethyl-diethylene triamine,
0.35 parts by weight of tin-II-(2-ethyl)-caproate and
2.0 parts by weight of dodecyldiphenyl-phosphite were mixed together thoroughly.
After adding 55 parts by weight of toluylene diisocyanate (72.5% 2,4- and 27.5% 2,6-isomers), the mixture was stirred thoroughly. After curing (2 hours at 100° C. and 4 weeks at room temperature), the foamed plastic was flocculated.

Polyurethane VI

This was flocked polyurethane flexible foam waste material of an unknown composition.

EXAMPLE 1

300 g of a mixture of 80 parts of 2,4- and 20 parts of 2,6-diisocyanatotoluene were mixed with 1 g of tin-II-chloride with stirring at 100° C. The mixture was heated to 150° C. 130 g of the Polyurethane I were then added to the diisocyanate in the form of flocks in portions with stirring while the temperature was maintained at 150° C. by heating. The foamed plastics addition was completed after 8 minutes and, after an additional 3 minutes, there was a clear solution. This solution was re-stirred for 15 minutes at 150° C. and allowed to cool. The resulting mixture had an isocyanate content of 27.3% and a viscosity of 5900 mPas measured at 25° C.

This experiment was repeated without using the tin catalyst. 50 minutes were required to add the foamed plastic. The foam was completely dissolved after an additional 5 minutes. The mixture was stirred for 15 minutes at 150° C. and then allowed to cool to room temperature. The mixture obtained had an NCO content of 22.4% and a viscosity of 261,000 mPas at 50° C.

EXAMPLE 2

300 g of the diisocyanate-isomer mixture of Example 1 were stirred with 2.4 g of tin-II-bromide at 100° C. The mixture was then heated to 150° C. and 170 g of the cube-form Polyurethane II was introduced as described in Example 1. The foam addition (mixing time=$t_M$) took 25 minutes. After an additional 6 minutes (dissolving time=$t_L$) the polyurethane was completely dissolved. The mixture was maintained at 150° C. with stirring for an additional 15 minutes and then cooled. The liquid mixture obtained had an isocyanate content of 25.7% and a viscosity of 17,200 mPas at 25° C.

This Example was repeated for comparison, without the tin catalyst. In this case, the foamed plastics addition took 250 minutes, and the mixture then had to be re-stirred at 150° C. for 140 minutes. The reaction mixture had an NCO content of 19.7% and solidified upon cooling to room temperature.

EXAMPLE 3

65 g of the Polyurethane III were introduced into a mixture of 300 g of the diisocyanatotolueleneisomer mixture described in Example 1 and were reacted with 1 g of tin-II-(2-ethyl)-caproate, as described in Example 1. The polyurethane dissolved within 10 minutes. The resulting mixture had an NCO content of 27.9% and a viscosity of 6,200 mPas at 25° C.

When the experiment was repeated, without using the catalyst essential to the invention, the reaction lasted 80 minutes. The viscosity of the mixture obtained was so high that it could not be measured at room temperature.

EXAMPLE 4

65 g of the Polyurethane IV (ground polyurethane rigid foamed plastic) were introduced into a mixture, produced at 100° C., of 300 g of the diisocyanatotolueneisomer mixture described in Example 1, with 1 g of tin-IV-chloride at 170° C., in the same manner as described in Example 1. The foamed plastics addition was completed after 7 minutes. The mixture was re-stirred for 13 minutes at 170° C. The liquid mixture had no NCO content of 33.6% and a viscosity of 272 mPas at 25° C.

This Example was repeated for comparison, without using the catalyst essential to the invention. After a reaction time of 2 hours, the rigid foamed plastic was still present as a swollen undissolved mass.

EXAMPLE 5

100 g of the Polyurethane I was reacted at 150° C. with a mixture of 300 g of the diisocyanatotolueneisomer mixture described in Example 1 and 1 g of tin-II-chloride, as described in Example 1. The foam addition was completed after 5 minutes. After a further 3 minutes, a solution of the polyurethane was produced which was stirred for a further 15 minutes at 150° C. After cooling to room temperature, there was a liquid mixture having an NCO content of 32.5% and a viscosity of 204 mPas at 25° C. The product was still liquid after being stored for 4 weeks at room temperature.

This Example was repeated for comparison, without using the catalyst essential to the invention. The foamed plastic material was added in 45 minutes. After a further 5 minutes, the polyurethane was dissolved and was re-stirred at 150° C. for 15 minutes. The viscous but still flowable product had an NCO content of 24.3%. After being stored for two days at room temperature, it had solidified into a solid.

EXAMPLE 6

65 g of the Polyurethane V were reacted with 300 g of the diisocyanatotoluene-isomer mixture described in Example 1 and 1 g of tin-IV-chloride in the same manner as described in Example 1. With a mixing time $t_M$ of 15 minutes and a re-stirring time $t_R$ of 15 minutes, a thinly liquid mixture with an NCO content of 37.2% and a viscosity of only 58 mPas at 25° C. was obtained. After being stored for three months at room temperature, the mixture had a viscosity of 73 mPas at 25° C.

EXAMPLES 7 to 10

These processes were carried out as in Example 6, but instead of SnCl₄, 1 g of the dissociation catalysts mentioned in Table 1 were used.

TABLE 1

| Example Number | Dissociation catalyst | $t_M$ (Min.) | $t_R$ (Min.) | NCO-content (%) | Viscosity at 25° C. (mPas) |
|---|---|---|---|---|---|
| 6 | SnCl₄ | 15 | 15 | 37.2 | 58 |
| 7 | SnCl₂ | 12 | 10 | 36.1 | 258 |
| 8 | Bi-octoate | 10 | 10 | 27.8 | 1200 |
| 9 | Fe-III-acac* | 15 | 30 | 33.7 | 167 |
| 10 | Zn-II-acac* | 8 | 15 | 35.5 | 99 |

*acac = acetylacetonate

EXAMPLE 11

This process was carried out as in Example 6, but instead of SnCl₄, 1 g of tin-II-octoate was admixed. 1 g of benzoyl chloride was admixed with the product at 130° C. during cooling.

Analytical and preparative data:
  $t_M$=4 minutes
  $t_R$=10 minutes
  % NCO=34.2
  viscosity at 25° C.-146 mPas and after 3 months 206 mPas.

EXAMPLE 12

Following the procedure described in Example 6, 2600 g of Polyurethane VI were reacted with 6000 g of the diisocyanatotoluene-isomer mixture described in Example 1, in the presence of 20 g of tin-IV-chloride. A liquid mixture with an NCO content of 28.9% and a viscosity of 652 mPas at 25° C. was obtained.

100 parts of the polyether used in the production of Polyurethane I, with the OH number 49,
  5 parts by weight of water,
  1.2 parts by weight of a polyether siloxane,
  0.2 parts by weight of triethyl diamine, and
  0.25 parts by weight of tin-II-(2-ethyl)-caproate were subsequently stirred together.
  106 parts by weight of the liquid mixture described above
were added to this mixture and mixed thoroughly for 10 seconds with a high speed stirrer. After a starting time of 20 seconds, the foam reaction commenced. After curing for 2 hours at 100° C. and pressing open the portion with closed cells, a flexible elastic polyurethane foam was obtained.

EXAMPLE 13

300 g of 4,4'-diphenylmethane diisocyanate were mixed with 0.1 g of SnCl₄ under nitrogen at 100° C. with stirring. The mixture was further heated to 150° C. and 15 g of Polyurethane V were added over a period of 5 minutes. After being stirred for an additional 130 minutes at 150° C., the mixture was cooled. After a small amount of high melting solid substance had been separated, a modified diphenylmethane diisocyanate which was liquid at room temperature was obtained. The viscosity of the liquid at 25° C. was 180 mPas.

When 300 g of 4,4'-diphenylmethane diisocyanate were stirred at 150° C. for 135 minutes, with or without 0.1 g of SnCl₄ under the same reaction conditions as above, the product completely solidified upon cooling to room temperature.

What is claimed is:

1. A process for the production of a mixture of isocyanate group containing compounds which mixture is liquid at room temperature and is suitable as an isocyanate component in the production of polyurethane plastic materials comprising reacting at a temperature between 100° and 250° C.
(a) up to 70 parts by weight polyurethane with,
(b) 100 parts by weight polyisocyanate having a melting or softening point below 50° C. in the presence of
(c) a catalytic quantity of a compound selected from acid and neutral salts, phenolates, enolates, and alcoholates of a metal of the 3rd, 4th, or 5th Main Group or 1st, 2nd, 4th, 7th or 8th subgroups of the Periodic System of elements.

2. The process of claim 1, in which polyurethane waste materials or polyurethane reject goods are used as the polyurethane.

3. The process of claim 1, in which polyisocyanates which are liquid at room temperature are used as the polyisocyanate.

4. The process of claim 1, in which the polyisocyanate is selected from the group consisting of 2,4-diisocyanatotoluene, mixtures thereof with 2,6-diisocyanatotoluene, liquid phosgenation products of aniline/formaldehyde condensates and hexamethylene diisocyanate.

5. The process of claim 1, in which the catalyst is selected from the group consisting of salts, enolates and phenolates of di- or tetravalent tin, zinc, trivalent iron or trivalent bismuth.

6. The process of claim 1, in which tin tetrachloride is used as the catalyst.

* * * * *